(12) United States Patent
Sasabayashi et al.

(10) Patent No.: US 8,593,785 B2
(45) Date of Patent: Nov. 26, 2013

(54) ELECTRONIC COMPONENT

(75) Inventors: Takehisa Sasabayashi, Nagaokakyo (JP); Takumi Taniguchi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 134 days.

(21) Appl. No.: 13/092,996

(22) Filed: Apr. 25, 2011

(65) Prior Publication Data
US 2011/0267736 A1 Nov. 3, 2011

(30) Foreign Application Priority Data
Apr. 30, 2010 (JP) ................. 2010-105604

(51) Int. Cl.
*H01G 4/06* (2006.01)
*H01G 4/005* (2006.01)
*H01G 4/012* (2006.01)
*H01G 4/228* (2006.01)

(52) U.S. Cl.
USPC ............ 361/321.2; 361/321.1; 361/303; 361/304; 361/306.1

(58) Field of Classification Search
USPC ............ 361/303, 304, 321.1, 321.2, 306.1
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |

(Continued)

FOREIGN PATENT DOCUMENTS

| | | |
|---|---|---|
| JP | 2002-260953 A | 9/2002 |
| JP | 2007-129224 A | 5/2007 |
| JP | 2010-129637 A | 6/2010 |

OTHER PUBLICATIONS

Kunishi et al., "Laminated Electronic Component and Method for Manufacturing the Same", U.S. Appl. No. 12/030,282, filed Feb. 13, 2008.
Kunishi et al., "Laminated Electronic Component and Method for Manufacturing the Same", U.S. Appl. No. 12/030,360, filed Feb. 13, 2008.
Tani, "Multilayer Electronic Component and Method for Manufacturing the Same", U.S. Appl. No. 12/481,690, filed Jun. 10, 2009.
Ito et al. "Laminated Ceramic Electronic Component", U.S. Appl. No. 12/489,631, filed Jun. 23, 2009.
Sasabayashi, "Multilayer Ceramic Electronic Component", U.S. Appl. No. 12/765,965, filed Apr. 23, 2010.

*Primary Examiner* — Eric Thomas
*Assistant Examiner* — Arun Ramaswamy
(74) *Attorney, Agent, or Firm* — Keating & Bennett, LLP

(57) ABSTRACT

A laminate includes insulating layers laminated to each other. Capacitor conductors are embedded in the laminate and have exposed portions exposed between the insulating layers at respective surfaces of the laminate. The capacitor conductors define a capacitor. External electrodes are provided by plating on the respective surfaces of the laminate so as to directly cover the respective exposed portions. When the laminate is viewed in plan in a y axis direction, the length of each of the exposed portions is approximately 35% to approximately 45% of the length of an outer periphery of the insulating layer.

4 Claims, 4 Drawing Sheets

(56) References Cited

U.S. PATENT DOCUMENTS

| | | |
|---|---|---|
| 7,177,137 B2 | 2/2007 | Ritter et al. |
| 7,344,981 B2 | 3/2008 | Ritter et al. |
| 7,345,868 B2 | 3/2008 | Trinh |
| 7,394,647 B2 * | 7/2008 | Togashi ............... 361/321.1 |
| 7,463,474 B2 | 12/2008 | Ritter et al. |
| 2005/0046536 A1 | 3/2005 | Ritter et al. |
| 2007/0014075 A1 | 1/2007 | Ritter et al. |
| 2007/0096254 A1 | 5/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2009/0268372 A1 * | 10/2009 | Ogawa et al. ............ 361/306.3 |
| 2010/0128413 A1 | 5/2010 | Takashima et al. |

* cited by examiner

ELECTRONIC COMPONENT

BACKGROUND OF THE INVENTION

1. Field of the Invention

The present invention relates to an electronic component, and more particularly, to an electronic component including a laminate in which insulating layers are laminated to each other.

2. Description of the Related Art

As a related electronic component, for example, a multilayer ceramic capacitor disclosed in Japanese Patent Application Publication No. 2007-129224 is known. The multilayer ceramic capacitor described in Japanese Patent Application Publication No. 2007-129224 includes a plurality of dielectric layers, a plurality of electrodes, and terminals. The dielectric layers and the electrodes are alternately laminated to each other. The terminals are external electrodes provided on a bottom surface of a laminate including the dielectric layers. In the multilayer ceramic capacitor described above, the electrodes are exposed between the dielectric layers at the bottom surface of the laminate, and the terminals are formed by plating portions at which the electrodes are exposed.

Incidentally, the multilayer ceramic capacitor must have a reduced equivalent series resistance (ESR). As a method for reducing the ESR, for example, a method in which the area of the electrode exposed from the bottom surface of the laminate is increased is known. With this method, the area of a portion at which the electrode and the terminal are connected is increased, and, thus, the ESR is reduced.

However, when the area of the electrode exposed from the bottom surface of the laminate is increased, delamination in which the dielectric layers are separated from each other is likely to occur. The electrode and the dielectric layer are made from different materials. Therefore, the adhesion between the electrode and the dielectric layer is relatively weak as compared to the adhesion between the dielectric layers. In addition, when a mother laminate is cut into a plurality of laminates, in each of which the electrodes are exposed from the bottom surface thereof, delamination may occur between the electrode and the dielectric layer bonded thereto with a relatively weak adhesion force by a stress applied to the laminate during the cutting.

SUMMARY OF THE INVENTION

To overcome the problems described above, preferred embodiments of the present invention provide an electronic component which prevents the generation of delamination while reducing the ESR.

According to a preferred embodiment of the present invention, an electronic component preferably includes a laminate including insulating layers laminated to each other, a first capacitor conductor which is embedded in the laminate and which includes a first exposed portion exposed between the insulating layers at a surface of the laminate, a second capacitor conductor which is embedded in the laminate, which includes a second exposed portion exposed between the insulating layers at a surface of the laminate, and which defines a capacitor together with the first capacitor conductor, a first external electrode provided on the surface of the laminate by plating to directly cover the first exposed portion, and a second external electrode provided on the surface of the laminate by plating to directly cover the second exposed portion. In the electronic component described above, when the laminate is viewed in plan in a lamination direction, the length of the first exposed portion and the length of the second exposed portion are each preferably approximately 35% to 45%, for example of the length of an outer periphery of each of the insulating layers.

According to various preferred embodiments of the present invention, the ESR is reduced and the generation of delamination is prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, an electronic component according to a preferred embodiment of the present invention will be described with reference to the drawings.

Figure 1:
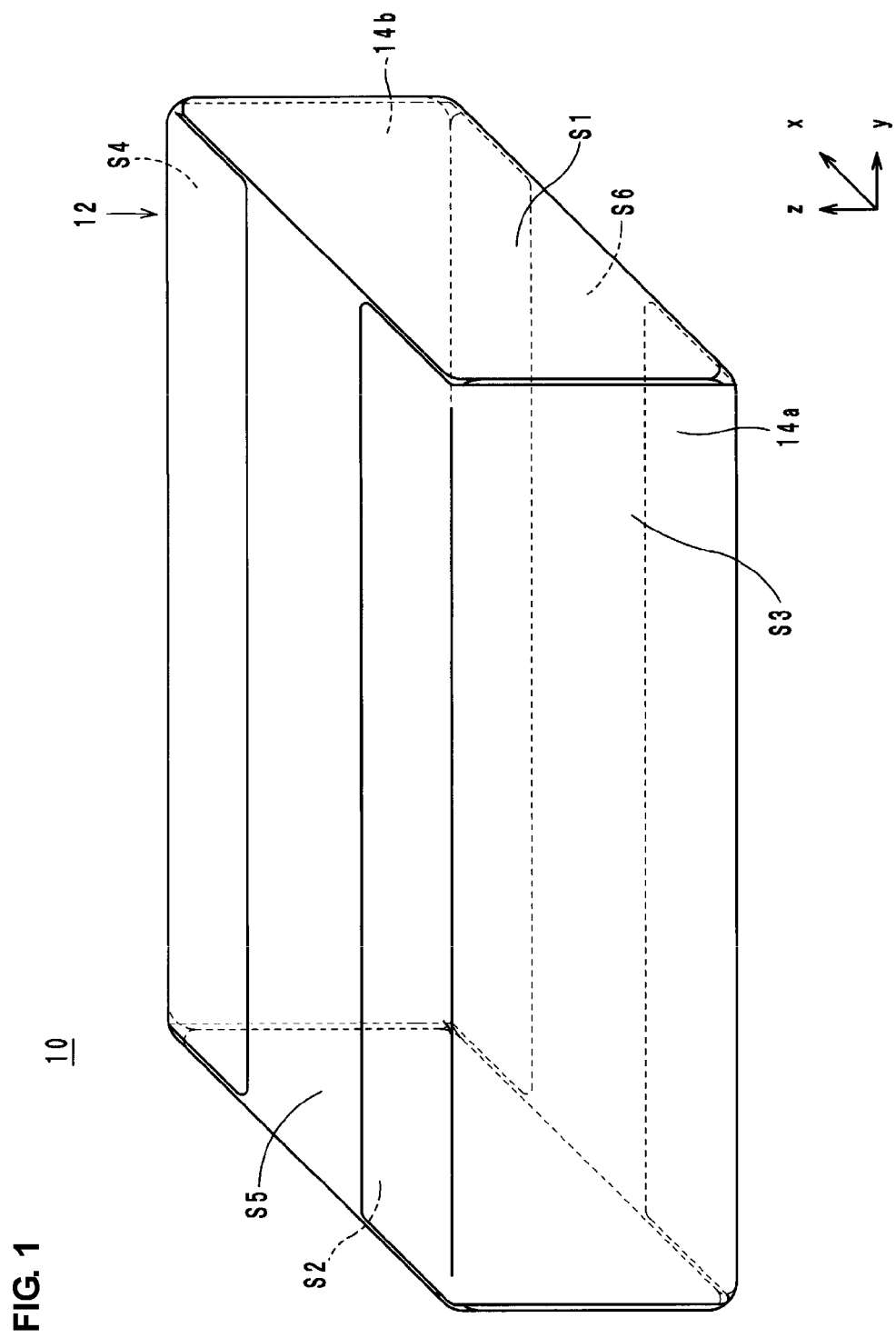
FIG. 1 is a perspective view of an electronic component according to a preferred embodiment of the present invention.
Figure 2:
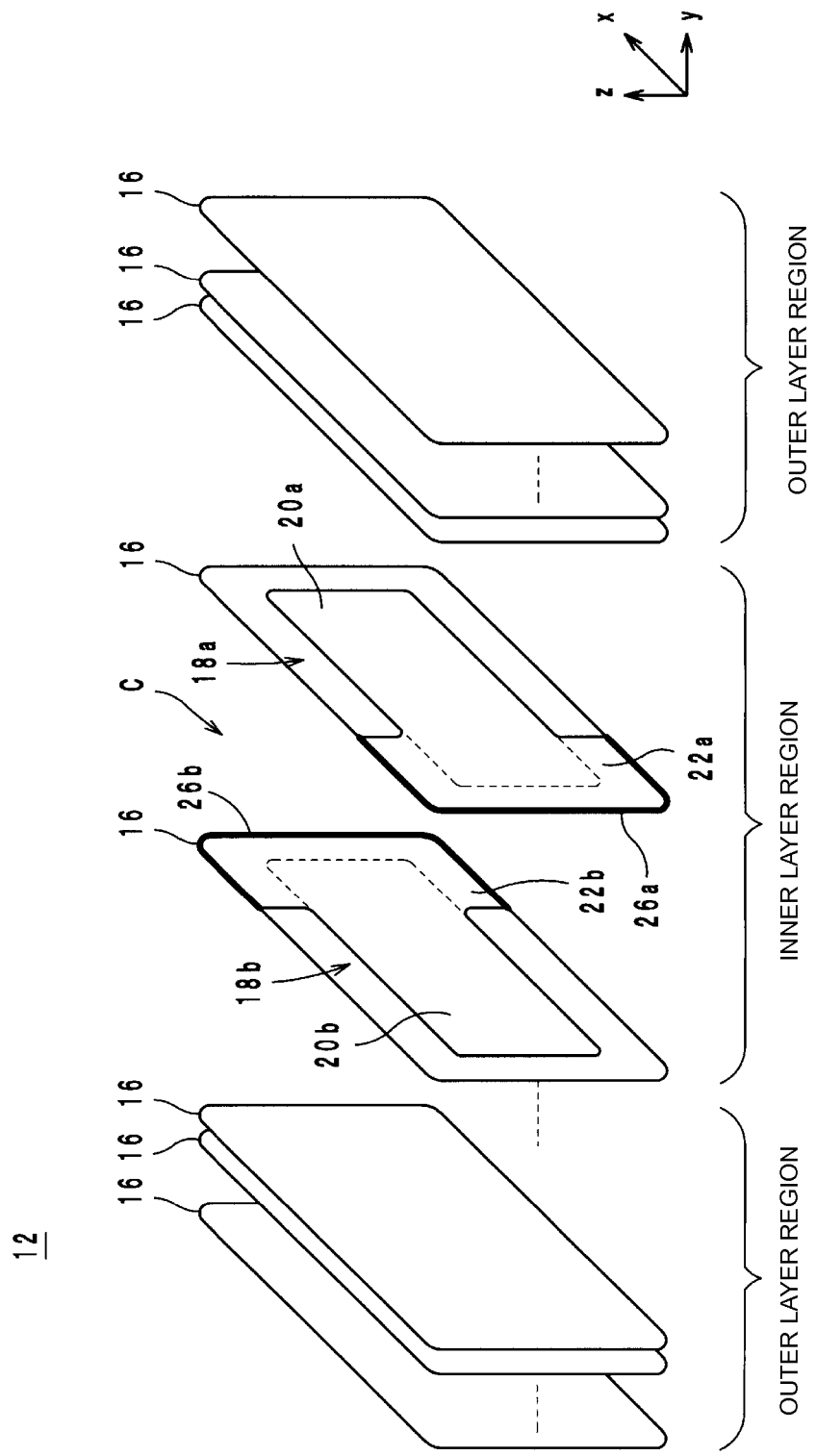
FIG. 2 is an exploded perspective view of a laminate of the electronic component shown in FIG. 1.

The structure of the electronic component will be described with reference to the drawings. FIG. 1 is a perspective view of an electronic component 10. FIG. 2 is an exploded perspective view of a laminate 12 of the electronic component 10. Hereinafter, the lamination direction of the laminate 12 is defined as a y axis direction. When the laminate 12 is viewed in plan in the y axis direction, a shorter side direction of the laminate 12 is defined as a z axis direction. When the laminate 12 is viewed in plan in the y axis direction, a longer side direction of the laminate 12 is defined as an x axis direction.

As shown in FIGS. 1 and 2, the electronic component 10 is a chip capacitor which includes the laminate 12, external electrodes 14 (14a and 14b), and a capacitor C (not shown in FIG. 1). The laminate 12 preferably has a substantially rectangular parallelepiped shape, for example. However, since chamfering is preferably performed, the laminate 12 has substantially round-shaped corners and ridge lines. The surface of the laminate 12 includes side surfaces S1 and S2, end surfaces S3 and S4, an upper surface S5, and a lower surface S6. Hereinafter, in the laminate 12, a surface at a positive direction side in the y axis direction is denoted as a side surface S1, and a surface at a negative direction side in the y axis direction is denoted as a side surface S2. In addition, a surface at a negative direction side in the x axis direction is denoted as an end surface S3, and a surface at a positive direction side in the x axis direction is denoted as an end surface S4. Furthermore, a surface at a positive direction side in the z axis direction is denoted as an upper surface S5, and a surface at a negative direction side in the z axis direction is denoted as a lower surface S6.

As shown in FIG. 2, the laminate 12 is preferably formed by laminating a plurality of insulating layers 16. Each of the insulating layers 16 preferably has a substantially rectangular shape, for example, and are made of a dielectric ceramic. The dielectric ceramic may preferably be made of, for example, BaTiO$_3$, CaTiO$_3$, SrTiO$_3$, or CaZrO$_3$. In addition, at least one of the materials described above may be used as a primary component, and for example, at least one of a Mn compound, a Mg compound, a Si compound, a Co compound, a Ni compound, and a rare earth compound may preferably be used as an accessory component. The thickness of the insulating layer 16 is preferably approximately 0.4 μm to approximately 10 μm, for example. Hereinafter, a primary surface of the insulating layer 16 at the positive direction side in the y axis direction is denoted as a front surface, and a primary surface of the insulating layer 16 at the negative direction side in the y axis direction is denoted as a rear surface.

Preferably, the side surface S1 of the laminate 12 is defined by the front surface of an insulating layer 16 provided at the most positive direction side in the y axis direction. The side surface S2 of the laminate 12 is defined by the rear surface of an insulating layer 16 provided at the most negative direction side in the y axis direction. In addition, the end surface S3 is defined by the shorter sides of the insulating layers 16 at the negative direction side in the x axis direction. The end surface S4 is defined by the shorter sides of the insulating layers 16 at the positive direction side in the x axis direction. The upper surface S5 is defined by the longer sides of the insulating layers 16 at the positive direction side in the z axis direction. The lower surface S6 is defined by the longer sides of the insulating layers 16 at the negative direction side in the z axis direction.

As shown in FIG. 2, the capacitor C is defined by capacitor conductors 18 (18a and 18b) embedded in the laminate 12. It is preferable that the capacitor conductors 18 be made, for example, of a conductive material, such as Ni, Cu, Ag, Pd, a Ag—Pd alloy, or Au, for example, and have a thickness of approximately 0.3 μm to approximately 2.0 μm, for example.

Preferably, the capacitor conductor 18a is provided on the front surface of one insulating layer 16 and includes a capacity portion 20a and a lead portion 22a. The capacity portion 20a preferably has a substantially rectangular shape, for example, and is not in contact with an outer periphery of the insulating layer 16. The lead portion 22a is preferably connected to the capacity portion 20a and extends to the longer sides and one shorter side of the insulating layer 16. More particularly, preferably, the lead portion 22a extends to the entire shorter side of the insulating layer 16 at the negative direction side in the x axis direction, to a portion of the longer side of the insulating layer 16 at the positive direction side in the z axis direction, and to a portion of the longer side of the insulating layer 16 at the negative direction side in the z axis direction. Accordingly, the lead portion 22a is exposed between adjacent two insulating layers 16 at the end surface S3, the upper surface S5, and the lower surface S6 of the laminate 12 to define a substantially U-shaped exposed portion 26a. As shown in FIG. 2, the exposed portion 26a preferably has a substantially continuous shape and is not divided.

Preferably, the capacitor conductor 18b defining the capacitor C together with the capacitor conductor 18a, is provided on the front surface of one insulating layer 16, and includes a capacity portion 20b and a lead portion 22b. Preferably, the capacity portion 20b has a substantially rectangular shape, for example, and is not in contact with an outer periphery of the insulating layer 16. The lead portion 22b is connected to the capacity portion 20b and is extended to the longer sides and one shorter side of the insulating layer 16. More particularly, preferably, the lead portion 22b extends to the entire shorter side of the insulating layer 16 at the positive direction side in the x axis direction, to a portion of the longer side of the insulating layer 16 at the positive direction side in the z axis direction, and to a portion of the longer side of the insulating layer 16 at the negative direction side in the z axis direction. Accordingly, the lead portion 22b is exposed between adjacent two insulating layers 16 at the end surface S4, the upper surface S5, and the lower surface S6 of the laminate 12 to define a substantially U-shaped exposed portion 26b. As shown in FIG. 2, the exposed portion 26b preferably has a substantially continuous shape and is not divided.

The capacitor conductors 18a and 18b are provided on a plurality of the insulating layers 16 so as to be alternately disposed in the y axis direction. Accordingly, the capacitor C is defined at a portion at which the capacity portion 20a faces the capacity portion 20b with the insulating layer 16 interposed therebetween. In addition, a region in which the insulating layers 16 provided with the capacitor conductors 18 are laminated is denoted as an inner layer region. In addition, preferably, at a positive direction side of the inner layer region in the y axis direction, insulating layers 16 provided with no capacitor conductor 18 are laminated, and at a negative direction side of the inner layer region in the y axis direction, insulating layers 16 provided with no capacitor conductor 18 are laminated. Hereinafter, these two regions in which the insulating layers 16 each provided with no capacitor conductor 18 are laminated are denoted as outer layer regions.

The external electrode 14a is preferably formed by plating on the end surface S3, the upper surface S5, and the lower surface S6 of the laminate 12 so as to directly cover the exposed portions 26a. More particularly, the external electrode 14a preferably covers substantially the entire end surface S3. Furthermore, the external electrode 14a is preferably folded from the end surface S3 to the upper surface S5 and the lower surface S6. In addition, the external electrode 14b is preferably formed by plating on the end surface S4, the upper surface S5, and the lower surface S6 of the laminate 12 so as to directly cover the exposed portions 26b. More particularly, the external electrode 14b preferably covers substantially the entire end surface S4. Furthermore, the external electrode 14b is preferably folded from the end surface S4 to the upper surface S5 and the lower surface S6. Since the external electrodes 14 are arranged as described above, the capacitor C is connected between the external electrodes 14a and 14b. The external electrodes 14 may preferably be made of, for example, Cu.

The electronic component 10 is configured to prevent the generation of delamination while reducing the ESR. In order to reduce the ESR, when the laminate 12 is viewed in plan in the y axis direction, the exposed portions 26a and 26b preferably have an increased length. On the other hand, in order to prevent the generation of delamination, when the laminate 12 is viewed in plan in the y axis direction, the exposed portions 26a and 26b preferably have a decreased length. Thus, the inventors of the present invention performed the following experiments and discovered that when the laminate 12 is viewed in plan in the y axis direction, the length L2 of each of the exposed portions 26a and 26b was preferably approximately 35% to approximately 45%, for example, of a length L1 of an outer periphery of the insulating layer 16. Hereinafter, the experiments performed by the inventors will be described.

The inventors of the preset invention formed electronic components of Examples 1 to 3 and Comparative Examples 1 to 4. The electronic components of Examples 1 to and Comparative Examples 1 to 4 had different configurations of capacitor conductors, and thus, the ratios L2/L1 were different from each other. Hereinafter, the structure of the electronic component of each of Examples 1 to 3 and Comparative Examples 1 to 4 will be described.

First, a structure common to the electronic components of Examples 1 to 3 and Comparative Examples 1 to 4 is shown below.

Figure 3:
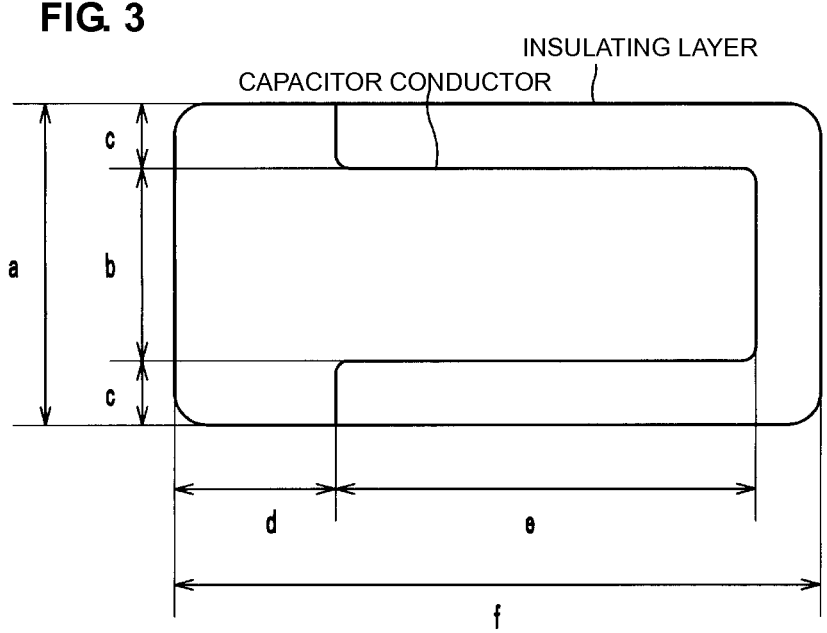
FIG. 3 is a plan view showing an insulating layer and a capacitor conductor in the electronic component shown in FIG. 1.

Dimensions: about 0.8 mm×about 0.5 mm×about 1.6 mm
Material for insulating layer: $BaTiO_3$
Number of insulating layers: 420 layers
Number of insulating layers in inner layer region: 330 layers
Number of insulating layers in outer layer region: 45 layers in each region
Thickness of insulating layer: about 3 μm
Material for capacitor conductor: Ni
Thickness of capacitor conductor: about 1 μm
Capacity of capacitor: about 0.47 μF
Material for external electrode: Cu plating/Ni plating/Sn plating Next, the structures of the capacitor conductors of the electronic components of Examples 1 to 3 and Comparative Examples 1 to 4 will be described. FIG. 3 is a plan view of the insulating layer and the capacitor conductor. Table 1 is a table showing the ratios L2/L1 and dimensions of portions (a to f) shown in FIG. 3 of the insulating layer and the capacitor conductor of the electronic component of each of Examples 1 to 3 and Comparative Examples 1 to 4. In addition, the dimensions of the portions a to f were each measured such that after the electronic component of each of Examples 1 to 3 and Comparative Examples 1 to 4 was cut, and a cross section thereof was polished, the individual portions of the capacitor conductor and the insulating layer were measured using a length measurement microscope. In addition, L1 indicates 2a+2f, and L2 indicates b+2c+2d.

TABLE 1

|  | a (mm) | b (mm) | c (mm) | d (mm) | e (mm) | f (mm) | L2/L1 |
|---|---|---|---|---|---|---|---|
| COMPARATIVE EXAMPLE 1 | 0.50 | 0.30 | 0.00 | 0.00 | 0.70 | 0.80 | 0.12 |
| COMPARATIVE EXAMPLE 2 | 0.50 | 0.30 | 0.10 | 0.10 | 0.60 | 0.80 | 0.27 |
| COMPARATIVE EXAMPLE 3 | 0.50 | 0.30 | 0.10 | 0.15 | 0.55 | 0.80 | 0.31 |
| EXAMPLE 1 | 0.50 | 0.30 | 0.10 | 0.20 | 0.50 | 0.80 | 0.35 |
| EXAMPLE 2 | 0.50 | 0.30 | 0.10 | 0.30 | 0.40 | 0.80 | 0.42 |
| EXAMPLE 3 | 0.50 | 0.30 | 0.10 | 0.33 | 0.37 | 0.80 | 0.45 |
| COMPARATIVE EXAMPLE 4 | 0.50 | 0.30 | 0.10 | 0.35 | 0.35 | 0.80 | 0.46 |

An ESR at a resonant point of the electronic component of each of Examples 1 to 3 and Comparative Examples 1 to 4 was measured using a network analyzer (E5071B, manufactured by Agilent Technologies Japan, Ltd.). In addition, the electronic component of each of Examples 1 to 3 and Comparative Examples 1 to 4 was inspected using a constant-depth mode scanning acoustic microscope (C-SAM) (INSIGHT-200, manufactured by SONIC Co., Ltd.), and the incidence of delamination was investigated. Table 2 shows the experimental results.

In Table 2, an ESR decreasing rate indicates a decreasing rate of the ESR of each of the electronic components with respect to the ESR of the electronic component of Comparative Example 1. In the electronic component of Comparative Example 1, as shown in Table 1, c and d are each 0 mm. This indicates that the capacitor conductor has a substantially rectangular shape and extends only to the end surface of the laminate.

TABLE 2

|  | L2/L1 | ESR (Ω) | ESR DECREASING RATE (%) | INCIDENCE OF DELAMINATION (%) |
|---|---|---|---|---|
| COMPARATIVE EXAMPLE 1 | 0.12 | 0.0096 | — | 0 |
| COMPARATIVE EXAMPLE 2 | 0.27 | 0.0090 | 6.2 | 0 |
| COMPARATIVE EXAMPLE 3 | 0.31 | 0.0088 | 8.3 | 0 |
| EXAMPLE 1 | 0.35 | 0.0085 | 11.5 | 0 |
| EXAMPLE 2 | 0.42 | 0.0080 | 16.7 | 0 |
| EXAMPLE 3 | 0.45 | 0.0078 | 18.8 | 0 |
| COMPARATIVE EXAMPLE 4 | 0.46 | 0.0077 | 19.8 | 10 |

According to Table 2, in the electronic component of each of Examples 1 to 3 and Comparative Example 4 in which the ratio L2/L1 was about 0.35 or greater, the ESR decreasing rate was about 10% or more. On the other hand, in the electronic component of each of Comparative Examples 1 to 3 in which the ratio L2/L1 was less than about 0.35, the ESR decreasing rate was less than about 10%. Therefore, it was determined that when the laminate was viewed in plan in the y axis direction, if the length L2 of each of the exposed portions 26a and 26b was about 35% or more of the length L1 of the outer periphery of the insulating layer 16, the ESR could be effectively reduced.

In addition, in the electronic component of Comparative Examples 1 to 3 and Examples 1 to 3 in which the ratio L2/L1 was about 0.45 or less, delamination was not generated. On the other hand, in the electronic component of Comparative Example 4 in which the ratio L2/L1 was more than about 0.45, delamination was generated. Thus, it was determined that when the laminate was viewed in plan in the y axis direction, if the length L2 of each of the exposed portions 26a and 26b was about 45% or less of the length L1 of the outer periphery of the insulating layer 16, the generation of delamination was prevented.

From the above experiments, it was determined that when the laminate was viewed in plan in the y axis direction, if the length L2 of each of the exposed portions 26a and 26b was set in the range of about 35% to about 45% of the length L1 of the outer periphery of the insulating layer 16, the ESR could be reduced, and the generation of delamination could be prevented.

Next, the inventors of the present invention formed electronic components of Examples 4 to 6 and Comparative Examples 5 to 8. In addition, the inventors of the present invention performed the same experiment on the electronic component of each of Examples 4 to 6 and Comparative Examples 5 to 8 that was performed on the electronic component of each of Example 1 to 3 and Comparative Examples 1 to 4. Hereinafter, the structure of the electronic component of each of Examples 4 to 6 and Comparative Examples 5 to 8 will be described.

First, a structure common to the electronic components of Examples 4 to 6 and Comparative Examples 5 to 8 is shown below.

Dimensions: about 0.5 mm×about 0.3 mm×about 1.0 mm
Material for insulating layer: $BaTiO_3$
Number of insulating layers: 270 layers
Number of insulating layers in inner layer region: 180 layers
Number of insulating layers in outer layer region: 45 layers in each region
Thickness of insulating layer: about 3 μm
Material for capacitor conductor: Ni Thickness of capacitor conductor: about 1 µm
Capacity of capacitor: about 0.10 µF
Material for external electrode: Cu plating/Ni plating/Sn plating Next, the structure of the capacitor conductor of the electronic component of each of Examples 4 to 6 and Comparative Examples 5 to 8 will be described. The dimensions of the individual portions of the insulating layer and the capacitor conductor are shown with reference to FIG. 3. Table 3 is a table showing the ratio L2/L1 and dimensions of the portions (a to f) shown in FIG. 3 of the insulating layer and the capacitor conductor of the electronic component of each of Examples 4 to 6 and Comparative Examples 5 to 8.

TABLE 3

|  | a (mm) | b (mm) | c (mm) | d (mm) | e (mm) | f (mm) | L2/L1 |
|---|---|---|---|---|---|---|---|
| COMPARATIVE EXAMPLE 5 | 0.30 | 0.20 | 0.00 | 0.00 | 0.40 | 0.50 | 0.13 |
| COMPARATIVE EXAMPLE 6 | 0.30 | 0.20 | 0.05 | 0.10 | 0.30 | 0.50 | 0.31 |
| COMPARATIVE EXAMPLE 7 | 0.30 | 0.20 | 0.05 | 0.12 | 0.28 | 0.50 | 0.34 |
| EXAMPLE 4 | 0.30 | 0.20 | 0.05 | 0.13 | 0.27 | 0.50 | 0.35 |
| EXAMPLE 5 | 0.30 | 0.20 | 0.05 | 0.17 | 0.23 | 0.50 | 0.40 |
| EXAMPLE 6 | 0.30 | 0.20 | 0.05 | 0.21 | 0.19 | 0.50 | 0.45 |
| COMPARATIVE EXAMPLE 8 | 0.30 | 0.20 | 0.05 | 0.22 | 0.18 | 0.50 | 0.46 |

An ESR at a resonant point of the electronic component of each of Examples 4 to 6 and Comparative Examples 5 to 8 was measured using a network analyzer. In addition, the electronic component of each of Examples 4 to 6 and Comparative Examples 5 to 8 was inspected using a C-SAM, and the incidence of delamination was investigated. Table 4 shows the experimental results.

TABLE 4

|  | L2/L1 | ESR (Ω) | ESR DECREASING RATE (%) | INCIDENCE OF DELAMINATION (%) |
|---|---|---|---|---|
| COMPARATIVE EXAMPLE 5 | 0.13 | 0.0155 | — | 0 |
| COMPARATIVE EXAMPLE 6 | 0.31 | 0.0142 | 8.4 | 0 |
| COMPARATIVE EXAMPLE 7 | 0.34 | 0.0140 | 9.7 | 0 |
| EXAMPLE 4 | 0.35 | 0.0139 | 10.3 | 0 |
| EXAMPLE 5 | 0.40 | 0.0133 | 14.2 | 0 |
| EXAMPLE 6 | 0.45 | 0.0128 | 17.4 | 0 |
| COMPARATIVE EXAMPLE 8 | 0.46 | 0.0127 | 18.1 | 12 |

According to Table 4, similar to the case shown in Table 2, it was determined that when the laminate was viewed in plan in the y axis direction, if the length L2 of each of the exposed portions 26*a* and 26*b* was set in the range of about 35% to about 45% of the length L1 of the outer periphery of the insulating layer 16, the ESR could be reduced and the generation of delamination could be prevented. Thus, it was determined that even if the size of the insulating layer 16 of the electronic component 10 and the size of the capacitor conductor 18 thereof were changed, when the length L2 of each of the exposed portions 26*a* and 26*b* was set in the range of about 35% to about 45% of the length of the outer periphery of the insulating layer 16, the ESR could be reduced and the generation of delamination could be prevented.

Next, a method for manufacturing the electronic component 10 will be described. The method will be described with reference to FIGS. 1 and 2.

After $BaTiO_3$, $CaTiO_3$, $SrTiO_3$, $CaZrO_3$, or other suitable material, for example, used as a primary component and a Mn compound, a Mg compound, a Si compound, a Co compound, a Ni compound, a rare earth compound, or other suitable material, for example, used as an accessory component are weighed at a predetermined ratio and are then charged in a ball mill, wet mixing is performed. After a mixture is obtained, dried, and then pulverized, an obtained powder is calcined. After a calcined powder is wet-pulverized by a ball mill, drying and pulverizing are sequentially performed, and as a result, a dielectric ceramic powder is obtained.

An organic binder and an organic solvent are added to the dielectric ceramic powder, and mixing is then performed using a ball mill. After a ceramic slurry is formed into sheets on a carrier sheet preferably by a doctor blade method, drying is performed so as to form ceramic green sheets which are to be formed into the insulating layers 16.

Next, the capacitor conductors 18*a* and 18*b* are formed on the ceramic green sheets which are to be formed into the insulating layers 16 preferably by applying a paste including a conductive material using a method, such as a screen printing or a photolithographic method, for example. As the paste including a conductive material, for example, a paste formed by adding an organic binder and an organic solvent to a metal powder may preferably be used.

Next, the ceramic green sheets which are to be formed into the insulating layers 16 are sequentially laminated to obtain a green mother laminate. In a step of sequentially pressure-bonding the ceramic green sheets, a pressure of approximately 10 kN to approximately 500 kN was applied thereto. Subsequently, pressure bonding is performed on the green mother laminate using a hydrostatic pressure press.

Next, the green mother laminate is cut into a plurality of green laminates 12 having a predetermined size.

Subsequently, a barrel polishing process is preferably performed on the surfaces of the laminates 12, so that the corners and the ridge lines of the laminates 12 are chamfered.

Next, the green laminate 12 is fired. As a firing temperature, for example, a temperature of approximately 900° C. to approximately 1,300° C. is preferable.

Finally, the external electrodes 14 are formed preferably by plating. The electronic component 10 is formed through the steps described above.

According to the electronic component 10 described above, as shown in the experiments, when the length L2 of each of the exposed portions 26*a* and 26*b* is set to approximately 35% to approximately 45% of the length L1 of the outer periphery of the insulating layer 16, the ESR is reduced and the generation of delamination is prevented.

The electronic component 10 according to preferred embodiments of the present invention is not limited to the preferred embodiments described above and may be modified within the scope of the present invention.

Figure 4:
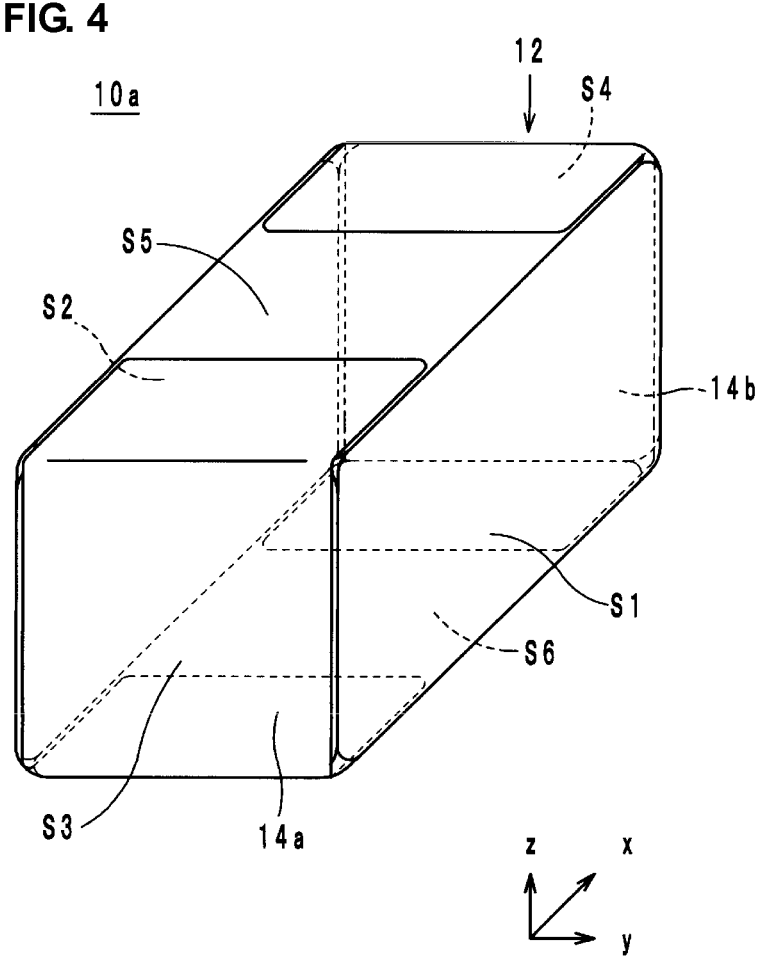
FIG. 4 is a perspective view of an electronic component according to another preferred embodiment of the present invention.

As shown in FIG. 1, when the electronic component 10 is viewed in plan in the z axis direction, the longer side and the shorter side thereof extended in the y axis direction and the x axis direction, respectively. However, as an electronic component 10*a* of another preferred embodiment shown in FIG. 4, when the electronic component 10*a* is viewed in plan in the z axis direction, the shorter side and the longer side may extended in the y axis direction and the x axis direction, respectively.

Although preferably formed by one plating step as described above, the external electrodes 14 may be formed by two or more plating steps, for example. In particular, after an underlayer plating film is formed by a first plating step, an upper-layer plating film may preferably be formed on the underlayer plating film by a second plating step. A material for the underlayer plating film and the upper-layer plating film is preferably a metal selected from Cu, Ni, Sn, Pb, Au, Ag, Pd, Bi, or Zn or an alloy containing at least two types of metals, for example. In addition, when Ni is used as a material for the capacitor conductor 18, Cu having good compatibility with Ni is preferably used as a material for the underlayer plating film. Furthermore, the upper-layer plating film may preferably have a two-layer structure including a first upper-layer plating film and a second upper-layer plating film. As a material for the first upper-layer plating film in contact with the underlayer plating film, Ni, for example, which is not likely to be eroded by solder, is preferably used. In addition, as a material for the second upper-layer plating film exposed to the outside, Sn or Au, for example, which has excellent solder wettability, is preferably used. The thicknesses of the underlayer plating film, the first upper-layer plating film, and the second upper-layer plating film are each preferably approximately 1 μm to approximately 15 μm, for example.

As has been described, preferred embodiments of the present invention are usefully applied to electronic components and, in particular, are excellent to prevent the generation of delamination while reducing the ESR.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
    a laminate including insulating layers laminated to each other, the laminate including first and second side surfaces that are opposed to each other, first and second end surfaces that are opposed to each other, and upper and lower surfaces that are opposed to each other;
    a first capacitor conductor embedded in the laminate and including a first exposed portion exposed between the insulating layers at one of the first and second end surfaces and the lower surface of the laminate;
    a second capacitor conductor embedded in the laminate, including a second exposed portion exposed between the insulating layers at the other of the first and second end surfaces and the lower surface of the laminate, and defining a capacitor together with the first capacitor conductor;
    a first external electrode provided on a surface of the laminate by plating and arranged to directly cover the first exposed portion; and
    a second external electrode provided on a surface of the laminate by plating and arranged to directly cover the second exposed portion; wherein
    when the laminate is viewed in plan in a lamination direction of the insulating layers, a length of the first exposed portion and a length of the second exposed portion are each approximately 35% to approximately 45% of a length of an outer periphery of each of the insulating layers; and
    the lower surface defines a mounting surface via which the electronic component is mount to a circuit board.

2. The electronic component according to claim 1, wherein the first and second external electrodes include a plurality of plating layers.

3. The electronic component according to claim 1, wherein the laminate includes inner insulating layers on which the first and second capacitor conductors are disposed and outer insulating layers sandwiching the inner insulating layers on which no capacitor conductors are disposed.

4. The electronic component according to claim 1, wherein each of the first and second external electrodes is arranged to cover substantially an entire longitudinal side surface of the laminate and portions of first and second opposed main surface of the laminate adjacent the longitudinal side surface.

* * * * *